United States Patent
Wu et al.

(10) Patent No.: US 9,191,071 B2
(45) Date of Patent: Nov. 17, 2015

(54) BROADBAND POWER LINE NETWORK DEVICE AND ETHERNET SIGNAL COUPLING DEVICE THEREOF

(75) Inventors: Hsiu-Wu Wu, Hsinchu (TW); Cheng-Kang Hu, Hsinchu (TW); Tzu-Nan Tai, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 741 days.

(21) Appl. No.: 13/469,244

(22) Filed: May 11, 2012

(65) Prior Publication Data

US 2013/0177049 A1  Jul. 11, 2013

(30) Foreign Application Priority Data

Jan. 5, 2012  (TW) ............................. 101100517 A
Jan. 5, 2012  (TW) ............................. 101200272 U

(51) Int. Cl.
*H04B 1/38* (2015.01)
*H04B 3/56* (2006.01)
*H04B 3/54* (2006.01)
(Continued)

(52) U.S. Cl.
CPC .................. *H04B 3/56* (2013.01); *H04B 3/542* (2013.01); *H04B 3/546* (2013.01); *H01F 27/402* (2013.01); *H02H 7/04* (2013.01)

(58) Field of Classification Search
CPC ................................. H04B 3/542; H04B 3/56
USPC .......................................................... 375/219
See application file for complete search history.

(56) References Cited

U.S. PATENT DOCUMENTS

| 5,751,536 | A  |   | 5/1998  | Haddad et al. |
| 7,153,163 | B2 | * | 12/2006 | Lewis et al. ............. 439/620.11 |
| 7,203,819 | B2 | * | 4/2007  | Suzuki et al. ................. 712/227 |

(Continued)

FOREIGN PATENT DOCUMENTS

| CN | 201243281 Y | 5/2009 |
| CN | 201869195 U | 6/2011 |

(Continued)

OTHER PUBLICATIONS

Kobayashi I: "Development of triple insulated wire", Electrical Insulation Conference, 1997, and Electrical Manufacturing & Coil Winding Conference. Proceedings Rosemont, IL, USA Sep. 22-25, 1997, New York, NY, USA,IEEE, US, Sep. 22, 1997 (1997-89-22).*

(Continued)

*Primary Examiner* — Rexford Barnie
*Assistant Examiner* — Elim Ortiz
(74) *Attorney, Agent, or Firm* — WPAT, PC; Justin King

(57) ABSTRACT

A broadband power line network device includes a printed circuit board, a power converter, a network control chip, a network connector, and an Ethernet signal coupling device. The printed circuit board includes a primary layout region and a secondary layout region. The primary layout region and the secondary layout region are separated from each other by a first distance. The power converter includes a pair of power-receiving terminals for receiving an AC voltage, thereby converting the AC voltage into a DC voltage. The network control chip is disposed on the primary layout region for receiving the DC voltage. The network connector is disposed on the secondary layout region for transmitting or receiving an external network signal. The Ethernet signal coupling device is arranged between the primary layout region and the secondary layout region.

14 Claims, 7 Drawing Sheets

(51) Int. Cl.
*H01F 27/40* (2006.01)
*H02H 7/04* (2006.01)

(56) References Cited

U.S. PATENT DOCUMENTS

| | | | | |
|---|---|---|---|---|
| 7,819,664 | B2* | 10/2010 | Petruk | 434/59 |
| 8,006,104 | B1* | 8/2011 | Sivertsen | 713/300 |
| 8,006,105 | B1* | 8/2011 | Sivertsen | 713/300 |
| 8,165,014 | B2* | 4/2012 | Brooks et al. | 370/218 |
| 8,435,019 | B2 | 5/2013 | Ichise et al. | |
| 8,831,552 | B1* | 9/2014 | He | 455/339 |
| 2005/0076148 | A1* | 4/2005 | Chan et al. | 709/246 |
| 2005/0243483 | A1* | 11/2005 | Chen et al. | 361/38 |
| 2006/0185877 | A1* | 8/2006 | Soffer | 174/50 |
| 2007/0014304 | A1* | 1/2007 | Wu et al. | 370/431 |
| 2007/0039035 | A1* | 2/2007 | Magin | 725/127 |
| 2008/0037192 | A1* | 2/2008 | Huang et al. | 361/118 |
| 2010/0284453 | A1* | 11/2010 | Brekke et al. | 375/222 |

FOREIGN PATENT DOCUMENTS

| | | |
|---|---|---|
| EP | 2187055 | 5/2010 |
| EP | 1017149 B1 | 9/2011 |
| FR | 2856208 A1 | 1/2007 |
| JP | 07-029755 | 1/1995 |
| JP | 2008-047517 | 2/2008 |
| JP | 2009-114961 | 5/2009 |
| JP | 2009-193680 | 8/2009 |
| JP | 2010-11136 | 1/2010 |
| JP | 2011-171577 | 9/2011 |
| WO | 2008011889 A1 | 1/2008 |

OTHER PUBLICATIONS

China Patent Office, "Office Action", Dec. 19, 2013.
Isamu Kobayashi, "Development of Triple Insulated Wire", Sep. 1997, New York, NY, USA, IEEE, US, Sep. 22, 1997, pp. 207-212, XP010265695.
European Patent Office, "Search Report", Nov. 15, 2013.
Japan Patent Office, "Office Action", Oct. 1, 2013.
Taiwan Intellectual Property Office, "Office Action", Jul. 17, 2014.
Australian Government IP Australia, OFFICE ACTION, Aug. 12, 2013, Australia.
European Patent Office, Search Report, Apr. 3, 2013, Germany.
Japan Patent Office, "Office Action", May 13, 2014.

* cited by examiner

US 9,191,071 B2

BROADBAND POWER LINE NETWORK DEVICE AND ETHERNET SIGNAL COUPLING DEVICE THEREOF

This application claims the benefits of Taiwan Patent Application No. 101100517, filed Jan. 5, 2012, and Taiwan Patent Application No. 101200272, filed Jan. 5, 2012, the subject matters of which are incorporated herein by reference.

FIELD OF THE INVENTION

The present invention relates to a broadband power line network device, and more particularly to a broadband power line network device with a non-isolated AC-DC power converter. The present invention also relates to an Ethernet signal coupling device of the broadband power line network device.

BACKGROUND OF THE INVENTION

With increasing development of science and technology, personal computers and networks are widely used in homes and become indispensable communication devices. For example, through network connection, personal computers in homes may be employed to exchange data, share data or print data. Nowadays, a power line communication (PLC) system is one of the most popular ways to connect many computers. In the PLC system, the electrical wires are utilized to connect these computers.

FIG. 1 schematically illustrates the architecture of a conventional broadband power line communication system. Generally, the home-use power outlets are found in many regions such as rooms, studies, living rooms, kitchens, or the like. These power outlets are connected with each other in parallel to provide AC power. In additions, the power outlets and the electric wires between these power outlets may be collectively employed to construct the broadband power line communication system. As shown in FIG. 1, the plug 105 of the personal computer 100 may be inserted into a first power outlet 110 to provide electrical power to the personal computer 100. The personal computer 100 may be in communication with another home-use computer (e.g. a notebook computer 200) through corresponding electrical wires within the power outlets.

Generally, in the broadband power line communication system, several broadband power line network devices are employed to transmit Ethernet signals at a data transmission rate higher than 10 Mbps. The network system that does not transmit Ethernet signals and the network system that transmit Ethernet signals at the data transmission rate lower than 10 Mbps are not considered as the broadband power line communication system. For brevity, in this context, the power line network devices are broadband power line network devices.

Please refer to FIG. 1 again. The network line 115 of the personal computer 100 is connected to a first power line network device 120, and the first power line network device 120 is plugged into a second power outlet 125. Similarly, the network line 215 of the notebook computer 200 is connected to a second power line network device 220, and the second power line network device 220 is plugged into a third power outlet 225. In such way, the personal computer 100 and the notebook computer 200 are in communication with each other, and the broadband power line communication system is established.

As is well known, the power outlet can provide a high AC voltage such as 110V or 220V. Consequently, the trace layout of each power line network device should comply with stringent safety regulations in order to prevent any user from directly contacting with the high AC voltage at any situation.

Therefore, there is a need of proving a power line network device for complying with the safety regulations and meeting the requirements of reduced trace layout area and reduced fabricating cost.

SUMMARY OF THE INVENTION

The present invention provides a broadband power line network device with a non-isolated AC-DC power converter. The broadband power line network device uses an Ethernet signal coupling device to isolate the high voltage, thereby preventing from injuring the user. In addition, the volume and the fabrication cost of the broadband power line network device will be reduced.

An embodiment of the present invention provides a broadband power line network device. The broadband power line network device includes a printed circuit board, a power converter, a network control chip, a network connector, and an Ethernet signal coupling device. The printed circuit board includes a primary layout region and a secondary layout region. The primary layout region and the secondary layout region are separated from each other by a first distance. The power converter is disposed on the primary layout region of the printed circuit board, and includes a pair of power-receiving terminals for receiving an AC voltage, thereby converting the AC voltage into a DC voltage. The network control chip is disposed on the primary layout region of the printed circuit board for receiving the DC voltage. The network connector is disposed on the secondary layout region of the printed circuit board for transmitting or receiving an external network signal. The Ethernet signal coupling device is arranged between the primary layout region and the secondary layout region of the printed circuit board. If the external network signal from the secondary layout region is received by the Ethernet signal coupling device, the Ethernet signal coupling device generates an internal network signal to the primary layout region. Alternatively, if the internal network signal from the primary layout region is received by the Ethernet signal coupling device, the Ethernet signal coupling device generates the external network signal to the secondary layout region. After the internal network signal is received and modulated by the network control chip, the internal network signal is converted into a modulated network signal and the modulated network signal is outputted from the broadband power line network device through the power-receiving terminals. Alternatively, after the modulated network signal from the power-receiving terminals is received by the network control chip, the modulated network signal is converted into the internal network signal and the internal network signal is transmitted to the Ethernet signal coupling device.

Another embodiment of the present invention provides an Ethernet signal coupling device. The Ethernet signal coupling device includes a primary side, a secondary side, a first transformer, and a second transformer. The primary side includes a plurality of signal terminals, which at least include a TX+ signal terminal, a TX− signal terminal, a RX+ signal terminal and a RX− signal terminal. The secondary side includes a plurality of signal terminals, which at least include a TD+ signal terminal, a TD− signal terminal, a RD+ signal terminal and a RD− signal terminal. The first transformer includes a primary coil coupled to the TX+ signal terminal and the TX− signal terminal and a secondary coil coupled to the TD+ signal terminal and the TD− signal terminal. The second transformer includes a primary coil coupled to the RX+ signal terminal and the RX− signal terminal and a secondary coil coupled to the RD+ signal terminal and the RD− signal terminal. The primary coil of the first transformer and the primary coil of the second transformer are wound by triple insulated wires, or the secondary coil of the first transformer and the secondary coil of the second transformer are wound by triple insulated wires.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
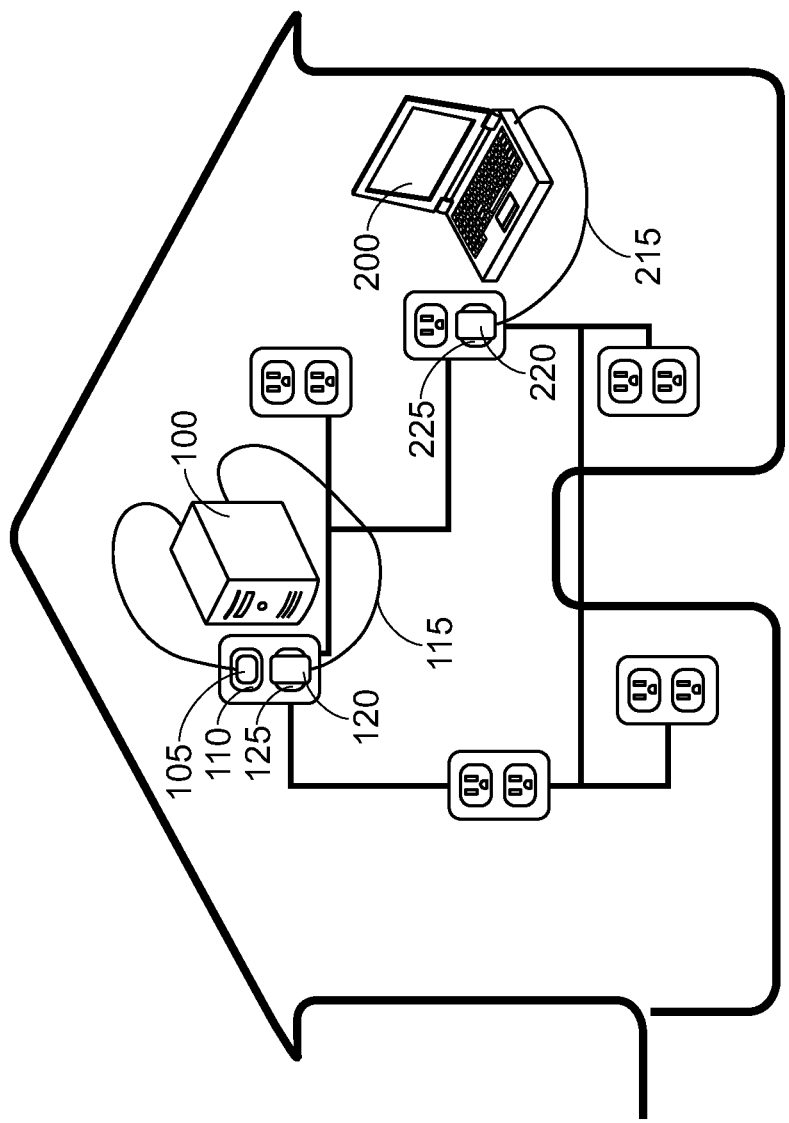
FIG. 1 (prior art) schematically illustrates the architecture of a conventional broadband power line communication system.
Figure 2:
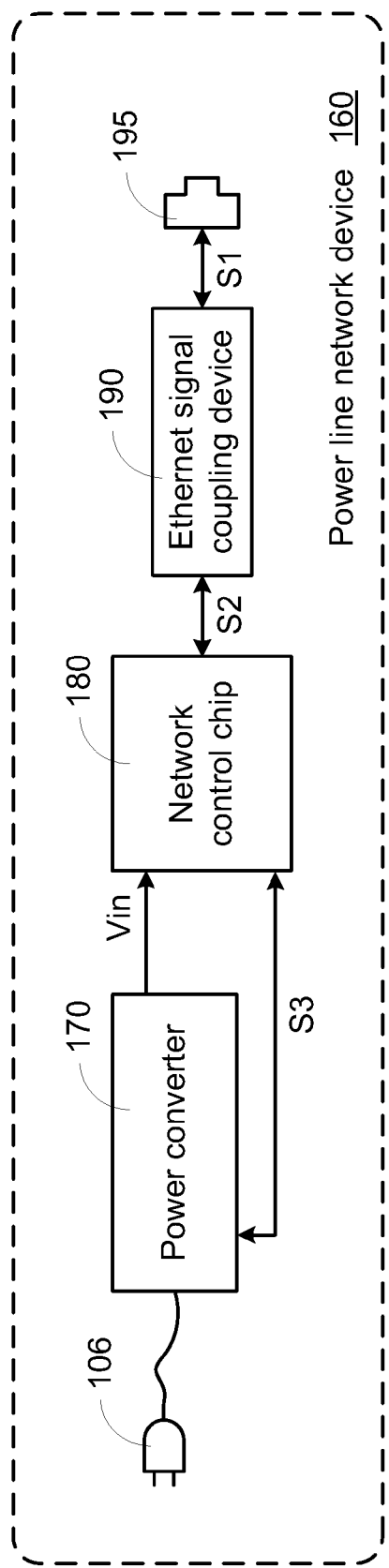
FIG. 2 is a schematic circuit block diagram illustrating a power line network device according to an embodiment of the present invention.

FIG. 2 is a schematic circuit block diagram illustrating a power line network device according to an embodiment of the present invention. As shown in FIG. 2, the power line network device 160 comprises a plug 106, a power converter 170, a network control chip 180, an Ethernet signal coupling device 190, and a network connector 195. The network connector 195 of the power line network device 160 is for example a RJ45 connector. The network connector 195 may be connected to a personal computer (not shown) through a network line. During the data transmission process, an external network signal S1 is transmitted from the personal computer to the Ethernet signal coupling device 190. In response to the external network signal S1, the Ethernet signal coupling device 190 generates an internal network signal S2 to the network control chip 180.

Basically, the external network signal S1 fails to be directly transmitted to the network control chip 180. Consequently, after the external network signal S1 is received by the Ethernet signal coupling device 190, the internal network signal S2 is induced and transmitted to the network control chip 180. In an embodiment, the Ethernet signal coupling device 190 is a signal transformer for receiving the external network signal S1 and generating the internal network signal S2.

After the internal network signal S2 is modulated by the network control chip 180, a modulated network signal S3 is outputted from the network control chip 180. The modulated network signal S3 is transmitted to the power converter 170, and then outputted to another power line network device (not shown) through the plug 106.

On the other hand, after the modulated network signal S3 from another power line network device (not shown) is received by the plug 106, the modulated network signal S3 is transmitted to the network control chip 180 through the power converter 170. After the modulated network signal S3 is demodulated by the network control chip 180, the internal network signal S2 is outputted from the network control chip 180. In response to the internal network signal S2, the Ethernet signal coupling device 190 generates the external network signal S1. The external network signal S1 is then transmitted to the personal computer (not shown).

In addition, the power converter 170 is connected to the plug 106 for receiving an external AC voltage and converting the external AC voltage into a DC voltage Vin. The DC voltage Vin is provided to the network control chip 180 for allowing normal operations of the network control chip 180.

In addition, the power converter 170, the network control chip 180 and the Ethernet signal coupling device 190 of the power line network device 160 are covered by an insulating housing (not shown). Consequently, only the plug 106 and the conductors (e.g. metal) of the network connector 195 may be touched by the user.

After the plug 106 of the power line network device 160 is inserted into a power outlet, only the conductor of the network connector 195 is possibly touched by the user. For protecting the user, the trace layout of the printed circuit board (PCB) of the power line network device 160 should comply with safety regulations. Consequently, even if the conductor of the network connector 195 is touched by the user, the user will not be injured. Generally, according to the safety regulations, the AC voltage higher than 42.4V or the DC voltage higher than 60V is defined as a dangerous voltage because the user may be injured by the AC voltage of 42.4V or the DC voltage of 60V.

For protecting the user, a first approach of the present invention utilizes an isolated AC-DC power converter. In the isolated AC-DC power converter, the high-voltage input terminal and the low-voltage output terminal are isolated from each other in order to maintain the safety of the output terminal. In an embodiment, a power transformer is used as the main coupling device of the isolated AC-DC power converter.

In the PCB trace layout of the power line network device 160, the power converter 170 is disposed on a primary layout region (i.e. a high-voltage region) of the printed circuit board, and the network control chip 180, the Ethernet signal coupling device 190 and the network connector 195 are disposed on a secondary layout region (i.e. a low-voltage region) of the printed circuit board. The primary layout region and the secondary layout region are not directly connected with each other. Whereas, a coupling device is used as the signal media between the primary layout region and the secondary layout region of the printed circuit board. The trace layout of the printed circuit board can prevent generation of the dangerous voltage at the secondary layout region.

Figure 3A:
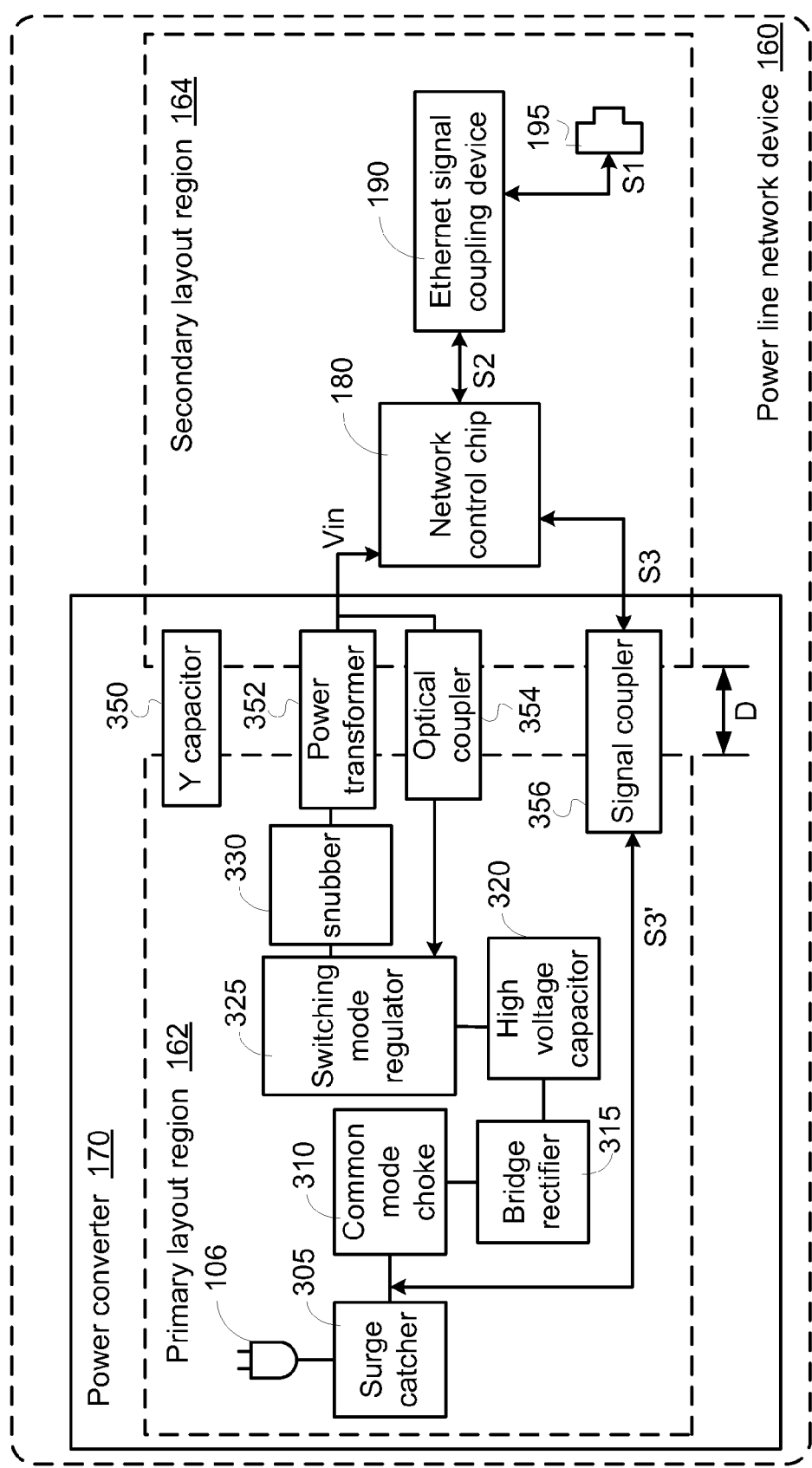
FIG. 3A is a schematic circuit block diagram illustrating a power line network device with an isolated AC-DC power converter according to an embodiment of the present invention.

FIG. 3A is a schematic circuit block diagram illustrating a power line network device with an isolated AC-DC power converter according to an embodiment of the present invention. As shown in FIG. 3A, the power line network device 160 is mounted on a single printed circuit board. In addition, the printed circuit board is divided into a primary layout region 162 (i.e. a high-voltage region) and a secondary layout region 164 (i.e. a low-voltage region). On the surface of the printed circuit board, the primary layout region 162 and the secondary layout region 164 are completely electrically isolated from each other. That is, there is no trace pattern between the primary layout region 162 and the secondary layout region 164.

Moreover, coupling devices are used as the signal and power media between the primary layout region 162 and the secondary layout region 164. In this embodiment, the coupling devices comprise a Y capacitor 350, a power transformer 352, an optical coupler 354, and a signal coupler 356.

Please refer to FIG. 3A again. Except for the coupling devices, the other components of the power converter 170 are all disposed on the primary layout region 162. A surge catcher 305, a common mode choke 310, a bridge rectifier 315, a high voltage capacitor 320, a switching mode regulator 325 and a snubber 330 are sequentially connected between the plug 106 and the power transformer 352. Basically, the common mode choke 310 is used for eliminating the common mode electromagnetic interference. The bridge rectifier 315 and a high voltage capacitor 320 are used for achieving the functions of DC voltage conversion and voltage stabilization. The switching mode regulator 325 is used for voltage conversion. The converted voltage is transmitted to the power transformer 352 through the snubber 330. Consequently, the power transformer 352 generates the DC voltage Vin to the network control chip 180. According to a change of the DC voltage Vin, the optical coupler 354 generates a control signal to the switching mode regulator 325. The modulated network signal S3 generated by the network control chip 180 is processed by the signal coupler 356, and thus an induced modulated network signal S3' is outputted from the signal coupler 356 to the plug 106 through the surge catcher 305.

For allowing the printed circuit board to comply with the safety regulations, the primary layout region 162 and the secondary layout region 164 should be separated from each other by a safety distance D. For example, the safety distance is greater than 3 mm (e.g. 5 mm).

Figure 3C:
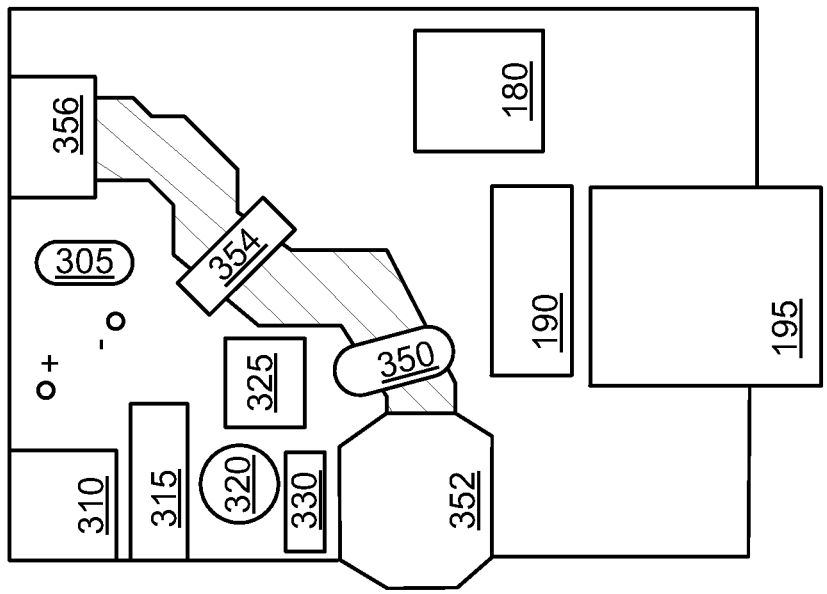
FIGS. 3B and 3C schematically illustrate the layout configuration of the printed circuit board and related components of the power line network device of FIG. 3A.
Figure 3B:
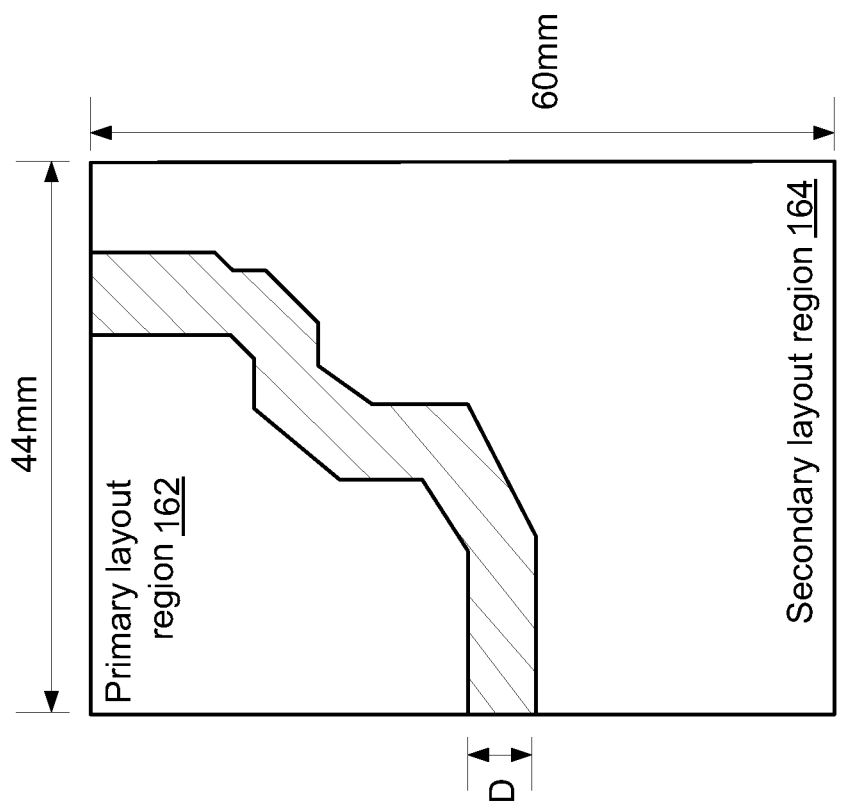

FIGS. 3B and 3C schematically illustrate the layout configuration of the printed circuit board and related components of the power line network device of FIG. 3A. As shown in FIG. 3B, the printed circuit board has a size of 44 mm×60 mm. In addition, the printed circuit board is divided into a primary layout region 162 and a secondary layout region 164. There is no trace pattern between the primary layout region 162 and the secondary layout region 164. The primary layout region 162 and the secondary layout region 164 should be separated from each other by a safety distance D.

As shown in FIG. 3C, related components of the power line network device are mounted on the printed circuit board. The primary layout region 162 has a pair of power-receiving terminals (+, −), which are connected to the power outlet (not shown). Furthermore, the surge catcher 305, the common mode choke 310, the bridge rectifier 315, the high voltage capacitor 320, the switching mode regulator 325 and the snubber 330 are disposed on the primary layout region 162. The network control chip 180, the Ethernet signal coupling device 190 and the network connector 195 are disposed on the secondary layout region 164. The Y capacitor 350, the power transformer 352, the optical coupler 354 and the signal coupler 356 are spanned across the primary layout region 162 and the secondary layout region 164.

As shown in FIG. 3C, the network connector 195 is disposed on the secondary layout region 164. In addition, no dangerous voltage is generated in the secondary layout region 164. Consequently, after the printed circuit board is covered by the insulating housing, even if the conductor (e.g. metal) of the network connector 195 is touched by the user, the user is not injured.

For further reducing the area of the printed circuit board, a second approach of the present invention utilizes a non-isolated AC-DC power converter. The use of the non-isolated AC-DC power converter can decrease the number of the coupling devices. However, since the high-voltage input terminal and the low-voltage output terminal of the non-isolated AC-DC power converter are not isolated from each other, the user is possibly injured.

For protecting the user, the printed circuit board is divided into a primary layout region and a secondary layout region. Both of a high voltage (e.g. a dangerous voltage) and a low voltage may be generated in the primary layout region. Whereas, only the low voltage may be generated in the secondary layout region. In the PCB trace layout of the power line network device 160, the power converter 170 and the network control chip 180 are disposed on the primary layout region, and the network connector 195 is disposed on the secondary layout region. The primary layout region and the secondary layout region are not directly connected with each other. Whereas, the Ethernet signal coupling device 190 is used as the signal media between the primary layout region and the secondary layout region of the printed circuit board.

Figure 4A:
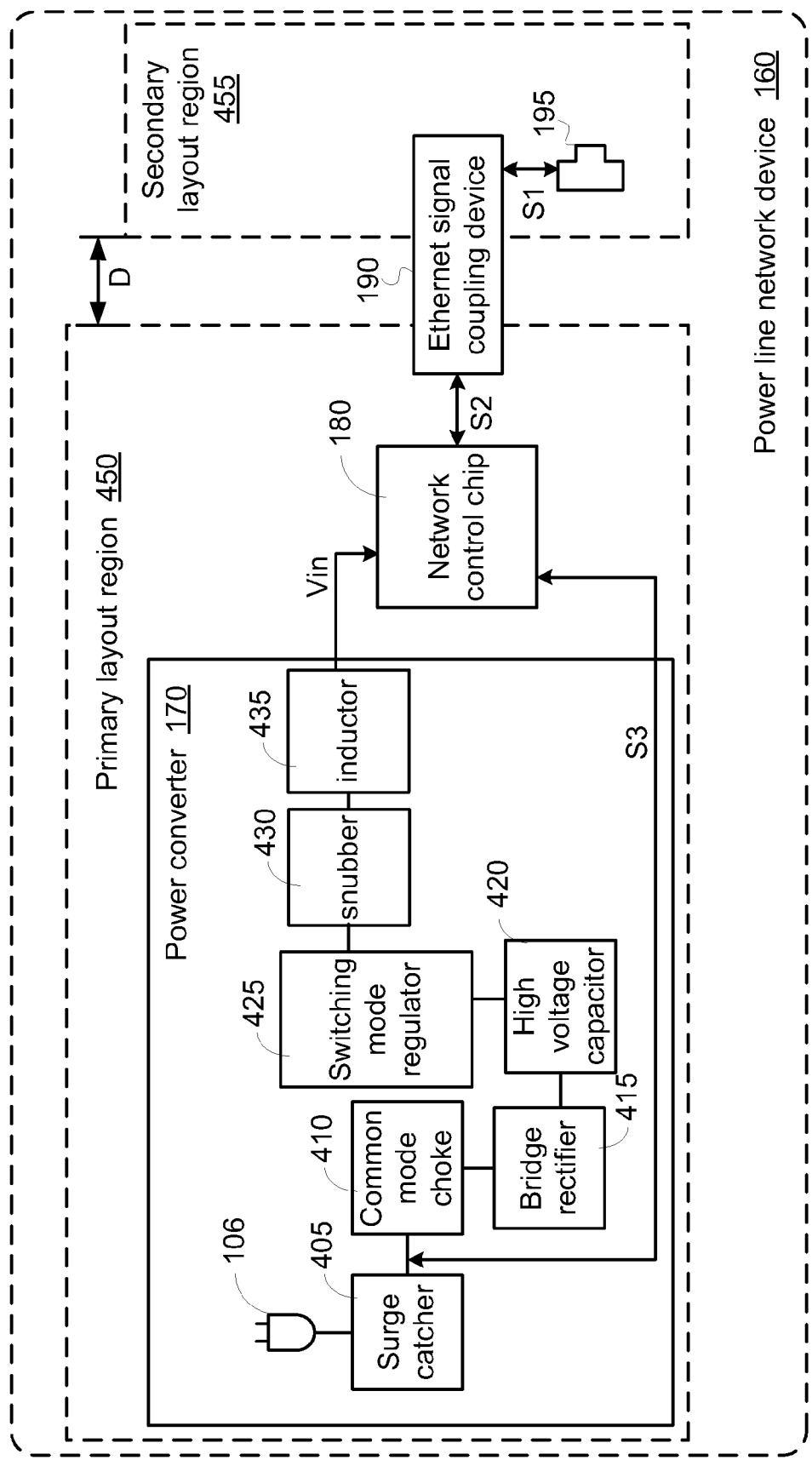
FIG. 4A is a schematic circuit block diagram illustrating a power line network device with a non-isolated AC-DC power converter according to an embodiment of the present invention.

FIG. 4A is a schematic circuit block diagram illustrating a power line network device with a non-isolated AC-DC power converter according to an embodiment of the present invention. As shown in FIG. 4A, the power line network device 160 is mounted on a single printed circuit board. In addition, the printed circuit board is divided into a primary layout region 450 and a secondary layout region 455. On the surface of the printed circuit board, the primary layout region 450 and the secondary layout region 455 are completely electrically isolated from each other. That is, there is no trace pattern between the primary layout region 450 and the secondary layout region 455.

Moreover, only the Ethernet signal coupling device 190 is used as the signal media between the primary layout region 450 and the secondary layout region 455. An example of the Ethernet signal coupling device 190 is a signal transformer.

Please refer to FIG. 4A again. The power converter 170 and the network control chip 180 are both disposed on the primary layout region 450. The power converter 170 comprises a surge catcher 405, a common mode choke 410, a bridge rectifier 415, a high voltage capacitor 420, a switching mode regulator 425, a snubber 430 and an inductor 435, which are sequentially connected between the plug 106 and the network control chip 180. Basically, the common mode choke 410 is used for eliminating the common mode electromagnetic interference. The bridge rectifier 415 and a high voltage capacitor 420 are used for achieving the functions of DC voltage conversion and voltage stabilization. The switching mode regulator 425 is used for voltage conversion. The converted voltage is transmitted to the inductor 435 through the snubber 430. Consequently, the inductor 435 generates the DC voltage Vin to the network control chip 180. The modulated network signal S3 generated by the network control chip 180 is transmitted to the plug 106 through the surge catcher 405.

For allowing the printed circuit board to comply with the safety regulations, the primary layout region 450 and the secondary layout region 460 should be separated from each other by a safety distance D.

Figures 4B, 4C:
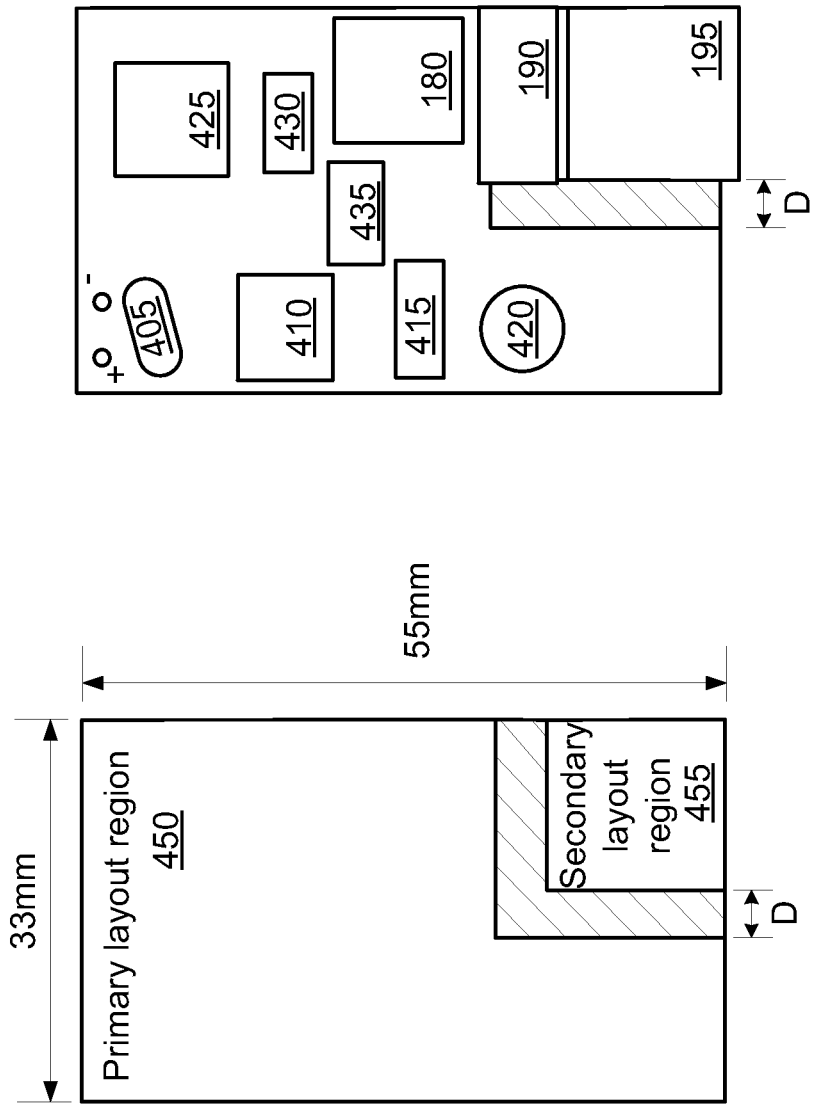
FIGS. 4B and 4C schematically illustrate the layout configuration of the printed circuit board and related components of the power line network device of FIG. 4A.

FIGS. 4B and 4C schematically illustrate the layout configuration of the printed circuit board and related components of the power line network device of FIG. 4A. As shown in FIG. 4B, the printed circuit board has a size of 33 mm×55 mm. In addition, the printed circuit board is divided into a primary layout region 450 and a secondary layout region 455. There is no trace pattern between the primary layout region 450 and the secondary layout region 455. The primary layout region 450 and the secondary layout region 455 should be separated from each other by a safety distance D.

As shown in FIG. 4C, related components of the power line network device are mounted on the printed circuit board. The primary layout region 450 has a pair of power-receiving terminals (+, −), which are connected to the power outlet (not shown). Furthermore, the surge catcher 405, the common mode choke 410, the bridge rectifier 415, the high voltage capacitor 420, the switching mode regulator 425, the snubber 430 and the inductor 435 of the power converter 170 and the network control chip 180 are all disposed on the primary layout region 450. Only the network connector 195 is disposed on the secondary layout region 455. The Ethernet signal coupling device 190 is spanned across the primary layout region 450 and the secondary layout region 455.

As shown in FIG. 4C, the network connector 195 is disposed on the secondary layout region 455. In addition, no dangerous voltage is generated in the secondary layout region 455. Consequently, after the printed circuit board is covered by the insulating housing, even if the conductor (e.g. metal) of the network connector 195 is touched by the user, the user is not injured.

From the above description, the present invention provides a broadband power line network device with a non-isolated AC-DC power converter. The broadband power line network device uses an Ethernet signal coupling device to isolate the high voltage, thereby preventing from injuring the user. In addition, the volume and the fabrication cost of the broadband power line network device will be reduced. Moreover, since the network control chip used in the power line network device of the present invention is capable of transmitting Ethernet signals at a data transmission rate higher than 10 Mbps, the power line network device is a high speed power line network device.

Figure 5:
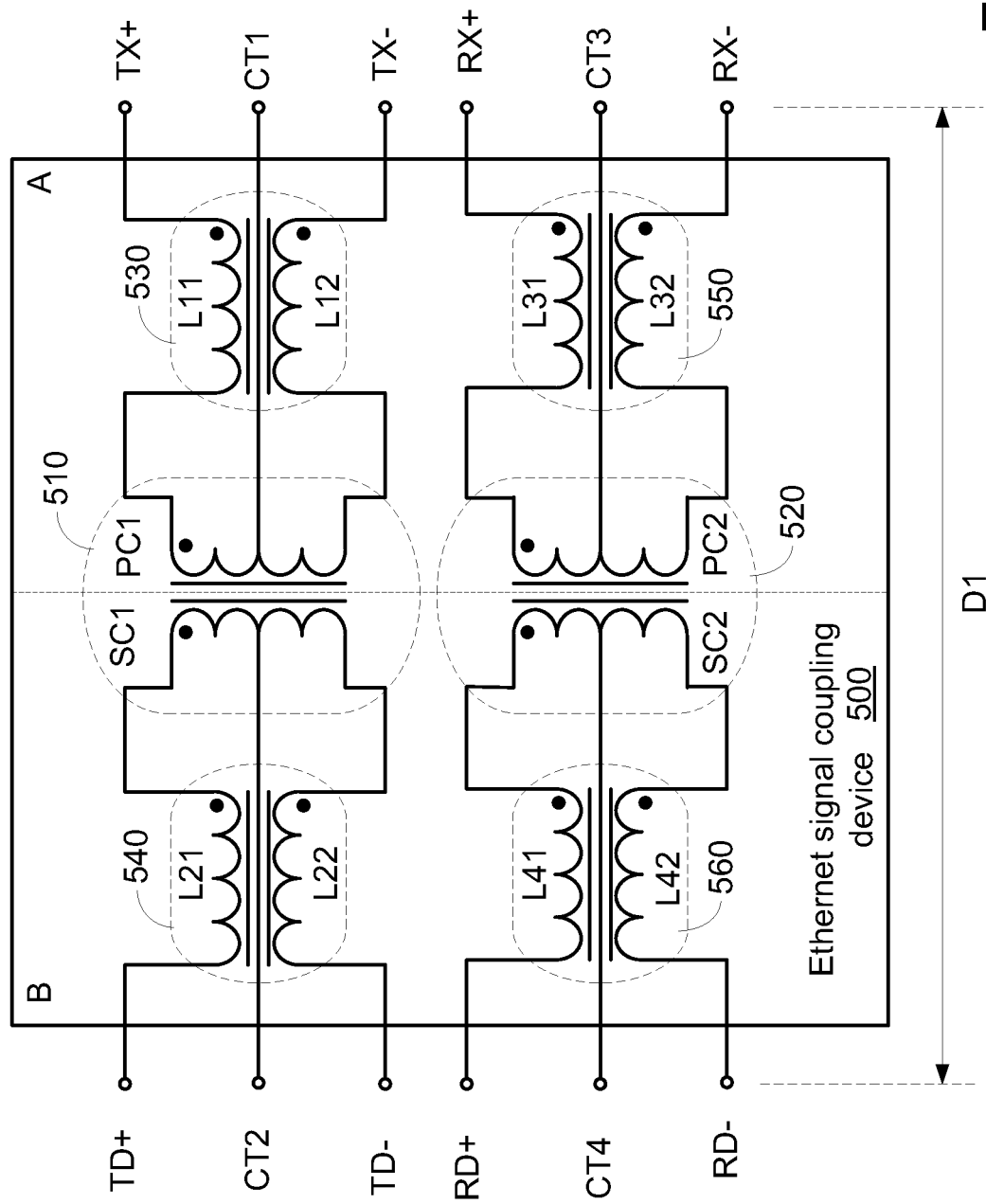
FIG. 5 is a schematic circuit block diagram illustrating an Ethernet signal coupling device used in the power line network device according to an embodiment of the present invention.

FIG. 5 is a schematic circuit block diagram illustrating an Ethernet signal coupling device used in the power line network device according to an embodiment of the present invention. The signal terminals at the primary side A of the Ethernet signal coupling device 500 at least comprise the signal terminals TX+, TX−, RX+ and RX−. The signal terminals at the secondary side B of the Ethernet signal coupling device 500 at least comprise the signal terminals TD+, TD−, RD+ or RD−. In addition to the above signal terminals, the Ethernet signal coupling device 500 may further comprise other signal terminals such as the common terminals (CT1~CT4).

In an embodiment, the signal terminals at the primary side A receive the external network signal, and the signal terminals at the secondary side B receive the internal network signal. Alternatively, the signal terminals at the secondary side B receive the external network signal, and the signal terminals at the primary side A receive the internal network signal. The external network signal is a network signal transmitted between the power line network device and an external electronic device (e.g. a personal computer). The internal network signal is a network signal that is generated and transmitted within the power line network device. Furthermore, each of the internal network signal and the external network signal at least comprises a differential transmitting signal pair and differential receiving signal pair.

Please refer to FIG. 5 again. The Ethernet signal coupling device 500 comprises a first transformer 510, a second transformer 520, a first common mode choke 530, a second common mode choke 540, a third common mode choke 550, and a fourth common mode choke 560.

Both of the first transformer 510 and the second transformer 520 are central-tapped transformers. In the coil of each of the first transformer 510 and the second transformer 520, one end of the coil with a dot denotes a first electrode terminal (e.g. a positive terminal), and the other end of the coil without the dot denotes a second electrode terminal (e.g. a negative terminal).

The TD+ signal terminal and the TD− signal terminal are used for transmitting the differential transmitting signal pair of the internal network signal. After the common mode noise contained in the differential transmitting signal pair of the internal network signal is eliminated by the second common mode choke 540, the differential transmitting signal pair of the internal network signal is inputted into the first transformer 510. Due to electromagnetic induction, the first transformer 510 generates a corresponding differential transmitting signal pair of the external network signal. After the common mode noise contained in the differential transmitting signal pair of the external network signal is eliminated by the first common mode choke 530, the differential transmitting signal pair of the external network signal is outputted from the TX+ signal terminal and the TX− signal terminal.

As shown in FIG. 5, the first electrode terminal of the first coil L11 of the first common mode choke 530 is connected to the TX+ signal terminal, and the first electrode terminal of the second coil L12 of the first common mode choke 530 is connected to the TX− signal terminal. The second electrode terminal of the first coil L21 of the second common mode choke 540 is connected to the TD+ signal terminal, and the second electrode terminal of the second coil L22 of the second common mode choke 540 is connected to the TD− signal terminal.

The first electrode terminal of the primary coil PC1 of the first transformer 510 is connected to the second electrode terminal of the first coil L11 of the first common mode choke 530. The second electrode terminal of the primary coil PC1 of the first transformer 510 is connected to the second electrode terminal of the second coil L12 of the first common mode choke 530. The central tap of the primary coil PC1 of the first transformer 510 is connected to the CT1 terminal. In addition, the first electrode terminal of the secondary coil SC1 of the first transformer 510 is connected to the first electrode terminal of the first coil L21 of the second common mode choke 540. The second electrode terminal of the secondary coil SC1 of the first transformer 510 is connected to the first electrode terminal of the second coil L22 of the second common mode choke 540. The central tap of the secondary coil SC1 of the first transformer 510 is connected to the CT2 terminal.

The RX+ signal terminal and the RX− signal terminal are used for receiving the differential transmitting signal pair of the external network signal. After the common mode noise contained in the differential transmitting signal pair of the external network signal is eliminated by the third common mode choke 550, the differential transmitting signal pair of the external network signal is inputted into the second transformer 520. Due to electromagnetic induction, the second transformer 520 generates a corresponding differential receiving signal pair of the internal network signal. After the common mode noise contained in the differential receiving signal pair of the internal network signal is eliminated by the fourth common mode choke 560, the differential receiving signal pair of the internal network signal is outputted from the RD+ signal terminal and the RD− signal terminal.

As shown in FIG. 5, the first electrode terminal of the first coil L31 of the third common mode choke 550 is connected to the RX+ signal terminal, and the first electrode terminal of the second coil L32 of the third common mode choke 550 is connected to the RX− signal terminal. The second electrode terminal of the first coil L41 of the fourth common mode choke 560 is connected to the RD+ signal terminal, and the second electrode terminal of the second coil L42 of the fourth common mode choke 560 is connected to the RD− signal terminal.

The first electrode terminal of the primary coil PC2 of the second transformer 520 is connected to the second electrode terminal of the first coil L31 of the third common mode choke 550. The second electrode terminal of the primary coil PC2 of the second transformer 520 is connected to the second electrode terminal of the second coil L32 of the third common mode choke 550. The central tap of the primary coil PC2 of the second transformer 520 is connected to the CT3 terminal. In addition, the first electrode terminal of the secondary coil SC2 of the second transformer 520 is connected to the first electrode terminal of the first coil L41 of the fourth common mode choke 560. The second electrode terminal of the secondary coil SC2 of the second transformer 520 is connected to the first electrode terminal of the second coil L42 of the fourth common mode choke 560. The central tap of the secondary coil SC2 of the second transformer 520 is connected to the CT4 terminal.

As shown in FIG. 5, the first transformer 510 and the second transformer 520 of the Ethernet signal coupling device 500 are used for receiving the external network signal and inducing the internal network signal, or receiving the internal network signal and inducing the external network signal.

Moreover, since the internal network signal and the external network signal are not electrically connected with each other, the high voltage of the power line network device can be effectively isolated.

Generally, the coils of the transformers and the common mode chokes are all produced by winding enameled wires. In practice, the degree of insulation of the enameled wire is usually insufficient to comply with the safety regulations. For increasing the insulating efficacy, the coils at the primary side A and/or the coils at the secondary side B are wound by triple insulated wires.

In an embodiment, the coils at the primary side A (e.g. including the primary coil PC1 of the first transformer 510, the primary coil PC2 of the second transformer 520, the first coil L11 and the second coil L12 of the first common mode choke 530, and the first coil L31 and the second coil L32 of the third common mode choke 550) are wound by enameled wires. Whereas, the coils at the secondary side B (e.g. including the secondary coil SC1 of the first transformer 510, the secondary coil SC2 of the second transformer 520, the first coil L21 and the second coil L22 of the second common mode choke 540, and the first coil L41 and the second coil L42 of the fourth common mode choke 560) are wound by triple insulated wires.

It is noted that, however, those skilled in the art will readily observe that numerous modifications and alterations may be made while retaining the teachings of the invention. For example, in some other embodiments, the coils at the primary side A are wound by triple insulated wires, and the coils at the secondary side B are wound by enameled wires. In such way, the Ethernet signal coupling device 500 can still comply with the safety regulations.

Since the triple insulated wires have better insulating efficacy, the insulating efficacy of the first transformer 510 and the second transformer 520 will be enhanced. That is, the uses of the triple insulated wires can effective isolate the high voltage and the network signal of the power line network device while complying with the safety regulations.

Please refer to FIG. 5 as well as FIG. 4. The Ethernet signal coupling device 500 is fixed on two separate layout regions of the printed circuit board (PCB). In an embodiment, the signal terminals at the primary side A are fixed on the primary layout region of the printed circuit board, and the signal terminals at the secondary side B are fixed on the secondary layout region of the printed circuit board. For complying with the safety regulations, the primary layout region and the secondary layout region are separated from each other by a safety distance D1 in order to achieve effective isolation. Consequently, in the Ethernet signal coupling device 500, the signal terminals at the primary side A and the signal terminals at the secondary side B are separated from each other by at least the safety distance D1. In an embodiment, the safety distance D1 is equal to or greater than 5 mm.

For achieving better insulating efficacy, in some other embodiments, the coils at the primary side A and the coils at the secondary side B are all wound by triple insulated wires.

From the above description, since the coils of the Ethernet signal coupling device of the present invention are wound by triple insulated wires, the insulating efficacy will be enhanced. In other words, the uses of the triple insulated wires can effective isolate the high voltage and the network signal of the power line network device while complying with the safety regulations.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. A broadband power line network device, comprising:
a single printed circuit board, comprising:
  a primary layout region, capable of generating a dangerous voltage; and
  a secondary layout region, wherein the primary layout region and the secondary layout region are separated from each other by a first distance and there are no conductive traces directly connected between the primary layout region and the secondary layout region on the single printed circuit board thereby galvanically isolating the primary layout region from the secondary layout region;
a power converter disposed on the primary layout region of the single printed circuit board, and comprising a pair of power-receiving terminals for receiving an AC voltage, thereby converting the AC voltage into a DC voltage;
a network control chip disposed on the primary layout region of the single printed circuit board for receiving the DC voltage;
a network connector disposed on the secondary layout region of the single printed circuit board for transmitting or receiving an external network signal; and an Ethernet signal coupling device arranged between the primary layout region and the secondary layout region of the single printed circuit board, wherein if the external network signal from the secondary layout region is received by the Ethernet signal coupling device, the Ethernet signal coupling device generates an internal network signal to the primary layout region, or if the internal network signal from the primary layout region is received by the Ethernet signal coupling device, the Ethernet signal coupling device generates the external network signal to the secondary layout region, wherein after the internal network signal is received and modulated by the network control chip, the internal network signal is converted into a modulated network signal and the modulated network signal is outputted from the broadband power line network device through the power-receiving terminals, or after the modulated network signal from the power-receiving terminals is received by the network control chip, the modulated network signal is converted into the internal network signal and the internal network signal is transmitted to the Ethernet signal coupling device.

2. The broadband power line network device as claimed in claim 1, wherein the network connector is a RJ45 connector.

3. The broadband power line network device as claimed in claim 1, wherein the power converter is a non-isolated AC-DC power converter.

4. The broadband power line network device as claimed in claim 3, wherein the non-isolated AC-DC power converter comprises a surge catcher, a common mode choke, a bridge rectifier, a high voltage capacitor, a switching mode regulator, a snubber and an inductor, which are connected between the power-receiving terminals and the network control chip.

5. The broadband power line network device as claimed in claim 4, wherein the modulated network signal is transmitted to the power-receiving terminals through the surge catcher.

6. The broadband power line network device as claimed in claim 1, wherein the first distance is a safety distance, and the safety distance is at least greater than 3 mm.

7. The broadband power line network device as claimed in claim 1, wherein the dangerous voltage is generated in the primary layout region, but the dangerous voltage is not generated in the secondary layout region, wherein the dangerous voltage is an AC voltage higher than 42.4V or the DC voltage higher than 60V.

8. The broadband power line network device as claimed in claim 1, wherein the power-receiving terminals are connected to a power outlet.

9. A broadband power line network device as claimed in claim 1, wherein the Ethernet signal coupling device comprising:
a primary side comprising a plurality of signal terminals, which at least include a TX+ signal terminal, a TX− signal terminal, a RX+ signal terminal and a RX− signal terminal;
a secondary side comprising a plurality of signal terminals, which at least include a TD+ signal terminal, a TD− signal terminal, a RD+ signal terminal and a RD− signal terminal;
a first transformer comprising a primary coil coupled to the TX+ signal terminal and the TX− signal terminal and a secondary coil coupled to the TD+ signal terminal and the TD− signal terminal; and
a second transformer comprising a primary coil coupled to the RX+ signal terminal and the RX− signal terminal and a secondary coil coupled to the RD+ signal terminal and the RD− signal terminal, wherein the primary coil of the first transformer and the primary coil of the second transformer are wound by triple insulated wires, or the secondary coil of the first transformer and the secondary coil of the second transformer are wound by triple insulated wires.

10. The broadband power line network device as claimed in claim 9, further comprising:
a first common mode choke comprising a first coil and a second coil, wherein A first electrode terminal of the first coil of the first common mode choke is connected to the TX+ signal terminal, and a first electrode terminal of the second coil of the first common mode choke is connected to the TX− signal terminal;
a second common mode choke comprising a first coil and a second coil, wherein a second electrode terminal of the first coil of the second common mode choke is connected to the TD+ signal terminal, and a second electrode terminal of the second coil of the second common mode choke is connected to the TD− signal terminal,
wherein the first electrode terminal of the primary coil of the first transformer is connected to the second electrode terminal of the first coil of the first common mode choke, the second electrode terminal of the primary coil of the first transformer is connected to the second electrode terminal of the second coil of the first common mode choke, the first electrode terminal of the secondary coil of the first transformer is connected to the first electrode terminal of the first coil of the second common mode choke, and the second electrode terminal of the secondary coil of the first transformer is connected to the first electrode terminal of the second coil of the second common mode choke.

11. The broadband power line network device as claimed in claim 10, wherein the first coil and the second coil of the first common mode choke are wound by the triple insulated wires, or the first coil and the second coil of the second common mode choke are wound by the triple insulated wires.

12. The broadband power line network device as claimed in claim 9, further comprising:
a third common mode choke comprising a first coil and a second coil, wherein a first electrode terminal of the first coil of the third common mode choke is connected to the RX+ signal terminal, and a first electrode terminal of the second coil of the third common mode choke is connected to the RX− signal terminal;
a fourth common mode choke comprising a first coil and a second coil, wherein a second electrode terminal of the first coil of the fourth common mode choke is connected to the RD+ signal terminal, and a second electrode terminal of the second coil of the fourth common mode choke is connected to the RD− signal terminal;
wherein the first electrode terminal of the primary coil of the second transformer is connected to the second electrode terminal of the first coil of the third common mode choke, the second electrode terminal of the primary coil of the second transformer is connected to the second electrode terminal of the second coil of the third common mode choke, the first electrode terminal of the secondary coil of the second transformer is connected to the first electrode terminal of the first coil of the fourth common mode choke, and the second electrode terminal of the secondary coil of the second transformer is connected to the first electrode terminal of the second coil of the fourth common mode choke.

13. The broadband power line network device as claimed in claim 12, wherein the first coil and the second coil of the third common mode choke are wound by the triple insulated wires, or the first coil and the second coil of the fourth common mode choke are wound by the triple insulated wires.

14. The broadband power line network device as claimed in claim 9, wherein the plurality of signal terminals at the primary side and the plurality of signal terminals at the secondary side are separated from each other by at least a first distance.

* * * * *